United States Patent Office 3,538,166
Patented Nov. 3, 1970

3,538,166
HALOGENATED POLYPHENYL THIOETHERS
AND METHOD FOR PREPARATION
John Robert Campbell, Tarkio, and Frank S. Clark, St.
Louis, Mo., assignors to Monsanto Company, St. Louis,
Mo., a corporation of Delaware
No Drawing. Filed Dec. 7, 1965, Ser. No. 512,206
Int. Cl. C07c *149/30, 149/34;* C10m *3/32*
U.S. Cl. 260—609                               20 Claims

ABSTRACT OF THE DISCLOSURE

A process for the production of thioethers by reacting an alkali metal sulfide with a halogen substituted aromatic or heterocyclic compound in an amide solvent and to novel polyphenyl thioethers produced thereby. Such compounds have many uses, but are especially useful as functional fluids.

---

This invention relates to a novel method for preparing aromatic and heterocyclic thioethers by reacting an alkali metal sulfide with a halogen-substituted aromatic or heterocyclic compound in an amide solvent and to certain new compounds produced thereby.

As used in the specification and claims the term "thioethers" is intended to mean a compound having at least one Y—S—Y group in the molecule and includes compounds which contain in addition one or more Y—O—Y group wherein Y represents an aromatic or heterocyclic group. Aromatic thioethers have been prepared by fusing a mixture of an aromatic chloride, an alkali metal or alkaline earth metal sulfide and sulfur and also by reacting unsubstituted aromatic hydrocarbons with sulfur or sulfur halides in the presence of a catalyst, such as aluminum chloride or iodine. Each of the methods described above has serious disadvantages, however, which have limited their commercial utilization. For example, the first method described results in the formaiton of resinous thioethers which can be characterized by the structure Ar—$S_x$—(Ar—$S_x$)$_n$—Ar where $x$ has a value of from 1 to 3 and $n$ has a value of from 5 to 7. This method is also limited in that it does not permit the production of the more simple thioethers where, in the foregoing characterization, $x$ is 1 and $n$ has a value of 0 to 3. In the case of the method involving the use of a catalyst, the more complex sulfides cannot be produced and it is extremely difficult to remove aluminum chloride or iodine from the final product.

It is also known that nitro-substituted diphenyl sulfides can be prepared by reacting nitro-substituted phenyl halides, in which a nitro group is ortho or para to the halogen, and sodium sulfide in alcohols. In such a procedure the nitro group, which is a strong electron-withdrawing group, activates the halogen to attack by sodium sulfide. This method is quite limited, however, in that only di(nitrophenyl) sulfides can be prepared.

Accordingly, it is an object of this invention to provide a novel method for the preparation of aromatic thioethers containing from two to eight aromatic rings and heterocyclic thioethers containing nitrogen or sulfur as the hetero atom. More particularly, it is an object of this invention to provide a novel method for the preparation of aromatic thioethers and heterocyclic thioethers which is commercially feasible and by which relatively pure products are obtained. A further object of this invention is to produce novel aromatic thioethers and heterocyclic thioethers.

According to the process of this invention, aromatic thioethers and heterocyclic thioethers are prepared by reacting:

(a) a halogen-substituted compound represented by the formula, $R(X)_n$ where R is selected from the group consisting of:
   (i) aromatic radicals and substituted aromatic radicals,
   (ii) heterocyclic radicals where the hetero atoms are selected from the group consisting of nitrogen and sulfur,
X is a halogen and $n$ is an integer from 1 to 4; with
(b) an alkali metal sulfide represented by the formula $Me_kH_lS$ where Me is selected from the group consisting of sodium, potassium and lithium, $k$ is an integer from 1 to 2, $l$ is an integer from 0 to 1 and the sum of $k$ and $l$ is 2, in an amide solvent selected from the group consisting of alkyl carboxamides represented by the structure

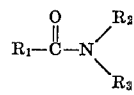

pyrrolidones represented by the structure

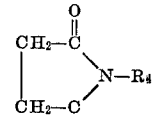

where $R_1$ is selected from the group consisting of

aryl, hydrogen and alkyl radicals having from 1 to 18 carbon atoms, $R_2$ and $R_3$ are selected from the group consisting of hydrogen and alkyl radicals of from 1 to 18 carbon atoms, providing at least one of $R_2$ and $R_3$ is an alkyl radical and $R_4$ is selected from the group consisting of hydrogen and an alkyl radical of from 1 to 18 carbon atoms and amides represented by the structure

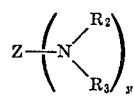

where Z is an acid radical residue selected from the group consisting of phosphorus and sulfur acids, $y$ is an integer from 1 to 3 and $R_2$ and $R_3$ have the same meaning as above.

Included within the term "substituted aromatic radicals" are aromatic radicals containing from 1 to 4 other substituent groups on the aromatic nucleus besides the reactive halogen, X. Exemplary of the many types of substituent groups which can be attached to the aromatic nucleus (R) are alkyl (1 to 20 carbons), alkoxy (1 to 20 carbons), halogen, aryloxy, aryl, alkaryl, aralkyl, polyaryloxy (2 to 4 nuclei), haloaryl, thioaryl, polythioaryl (2 to 4 nuclei), halothioaryl, hydroxyl, haloalkyl, haloaryloxy groups and the like.

In practicing the process of the present invention, the alkali metal sulfide, halogen-substituted compound and amide solvent are combined in indifferent order and the resulting mixture is heated for a sufficient length of time to complete the reaction. Thereafter the solvent is removed and the desired product is separated from the reaction mass by conventional techniques, such as by solvent extraction and distillation.

In carrying out the process, pot temperatures of about 100° C. to about 350° C. can be used, however, temperatures will generally be above 150° C. Preferred temperatures are of the order of about 180° C.–210° C. The process of the invention can be readily practiced by operating above atmospheric pressure in which case any tempertaure below decomposition temperatures of the reactants or solvent can be employed. As a matter of convenience, however, temperatures above about 300° C. to 400° C. will not be used.

Also, alkali metal sulfides are more readily available in the hydrate form. Therefore, if a hydrate is used the water of hydration can be removed prior to mixing the reactants or solvent can be employed. As a matter of reaction mixture. Alkali metal hydrosulfides, having the formula MeHS, where Me has the same significance as above, can be used instead of the alkali metal sulfides. Typical examples of alkali metal hydrosulfides are sodium hydrosulfide, potassium hydrosulfide and lithium hydrosulfide. Although not critical, it is preferred to conduct the reatcion in a nitrogen atmosphere to avoid possible oxidation of intermediate thiols.

The methods of the prior art are generally restricted to the use of chlorine- and bromine-substituted compounds and require an activator in order to react the halogen on the aromatic nucleus. In the present method, however, no activator is required and any member of the halogen family, including fluorine, can be used. Also, it is to be noted that the aromatic halides useful in the method of this invention are not only those containing a single halogen species but also include those containing different halides such as bromo-chloro, chloro-fluoro, chloroiodo compounds and the like.

Aromatic compounds produced according to the method of this invention can be isomeric mixtures or an essentially single isomer, the nature of the product being determined by the starting material. For intsance, to produce essentially pure bis(m-chlorophenyl) sulfide, one would employ m-dichlorobenzene as a starting material. Mixed isomeric products can be produced by employing starting materials which consist of an isomeric mixture of halogenated reactants.

Novel thioethers which can be prepared according to the method of this invention can be represented by the formula (1) 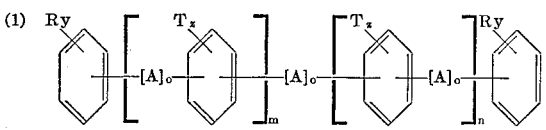

where R is selected from the group consisting of alkyl and alkoxy groups having from 1 to 4 carbon atoms, hydroxyl and hydrogen, T is selected from the group consisting of alkyl and alkoxyl groups having from 1 to 20 carbon atoms, and hydroxyl, A is selected from the group consisting of oxygen and sulfur provided at least one A is sulfur, $y$, $m$ and $n$ are integers from 0 to 3 provided the sum of $m+n$ is at least 1, $z$ is an integer from 1 to 3 and $o$ is an integer from 0 to 1 provided at least one $o$ is 1.

Compounds of structure I can be prepared by the process of this invention employing, as reactants with alkali metal sulfide, monohalogenated-substituted biphenyl, aromatic ethers and thioethers having from 2 to 4 phenyl rings wherein the substituents correspond to $R_y$ and $T_z$ and the halogen is on a terminal aromatic ring. Examples of monohalogenated-subtsituted aromatic ethers and thioethers are halobenzenes and substituted halobenzenes wherein the substituents $R_y$ and $T_z$ are chlorodixylyl ether, bromodicresyl sulfide, fluoroditolyl ether, 1-chloro-3-xylyloxybenzene, 1-fluoro-4-tolylmercaptobenzene, 1-(m-chlorophenoxy)-3-(m-ethylphenoxy)benzene, 1-(m-fluorophenoxy)-4-(o-methoxyphenoxy)benzene and 3-(m-chlorophenoxy) - 3' - (phenoxy)diphenyl ether radicals.

Novel halogenated thioethers which can be prepared according to the method of this invention can be represented by the formula

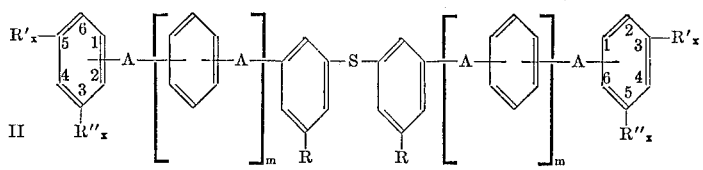

where R, R' and R" are each halogen, $x$ is an integer from 0 to 1 and A is selected from the group consisting of oxygen and sulfur and $m$ is an integer from 0 to 2, provided both terminal phenyl groups are attached to A at like positions equal distant on the ring from both $R'_x$ and $R''_x$, i.e., at positions 1 or 4 as indicated. Compounds of structure II are prepared according to the method of this invention by employing halogenated aromatic ethers and thioethers which can be represented by the formula III 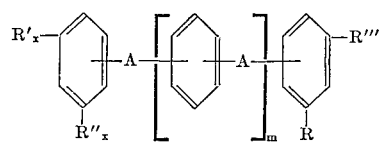

where R, R', R", A, $x$ and $m$ have the same meanings as above, R''' is a halogen and provided both terminal rings are attached to A at like positions equal distant on the ring from the substituent groups.

To prepare compounds of Formula II it has been found that maximum yield of the desired product is obtained by employing a molar ratio of the halogenated aromatic ether or thioether to alkali metal sulfide of greater than 2:1, respectively. Other reaction conditions are as herein set forth. The desired compound can be recovered from the reaction mixture after removal of the amide solvent by conventional methods such as by fractional distillation.

Mixtures of novel substituted thioethers can be prepared according to the method of this invention by employing asymmetrical polyhalogenated aromatic ethers and thioethers having from 1 to 4 phenyl rings and mixtures thereof as reactants with alkali metal sulfides. The mixtures of novel substituted thioethers are comprised of compounds which can be represented by the formula IV 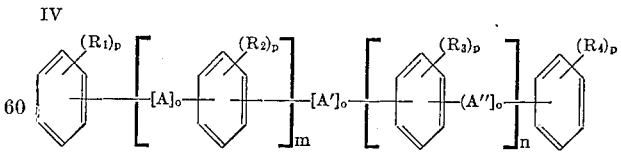

where $R_1$, $R_2$, $R_3$ and $R_4$ are each selected from the group consisting of alkyl, alkoxy, haloalkyl, said alkyl and alkoxy radicals having from 1 to 4 carbon atoms, hydroxyl, aryl radicals, aryloxy radicals, phenylmercapto radicals, haloaryl radicals, alkaryl radicals, hydrogen and halogen provided at least one of $R_2$ and $R_3$ is not hydrogen, A, A' and A" are each selected from the group consisting of oxygen and sulfur provided at least one of A, A' and A" is sulfur, $m$ and $n$ are integers from 0 to 3 provided the sum of $m+n$ is at least 1, $p$ is an integer from 1 to 3 and $o$ is an integer from 0 to 1 providing at least one $o$ is 1. Such mixture can contain halogenated compounds which compounds result from reactions according to the method of this invention wherein the amount of alkali metal sulfide employed is less than the stoichiometric amount required to react all the halogens of the aromatic halide reactant.

The asymmetrical polyhalogenated compounds which are useful in preparing mixtures of compounds of Formula IV according to the method of this invention are (A) compounds represented by the formula

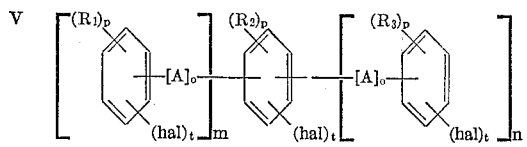

where $R_1$, $R_2$, $R_3$, $p$ and $A$ have the same meaning as above, $m$ and $n$ are integers from 0 to 2 provided the sum of $m+n$ is not greater than 3, $o$ is an integer from 0 to 1, $p$ is an integer from 1 to 3, hal means reactive halogens, $t$ is an integer from 1 to 3 and provided that there are at least 2 halogens asymmetrically disposed within the molecule and (B) mixtures thereof. The reactive halogens are represented in the above Formula V by hal to distinguish them from halogens represented by R, $R_1$ and $R_2$ which do not react. The distinction is made to point out that when an amount of alkali metal sulfide is employed which is less than the stoichiometric amount required to react with all of the halogens of the aromatic halide reactant the product will contain halogen. The distinction is graphic only and no significance is intended with regard to ring position or any other structural detail which would influence the reaction of the halide with the alkali metal sulfide.

Typical examples of asymmetrically halogenated compounds useful in the method of this invention are:

3,3′,5-trichlorodiphenyl sulfide,
2-methoxy-3,3′,5-trichlorodiphenyl sulfide,
2,4-dichlorodiphenyl sulfide,
2,4′-dichlorodiphenyl ether,
2,4,4′-trichlorobiphenyl,
2,2′-dichloro-3-phenoxy-3′-phenylmercaptodiphenyl sulfide,
2,3-dichloro-4-methoxydiphenyl ether,
2,3′-diethyl-4,4′-(m-chlorophenoxy)diphenyl sulfide,
2,4-difluorodiphenyl ether,
2,4-dichloro-3-methoxydiphenyl ether,
2,4-difluoro-3-(o-fluorophenylmercapto)-5-phenoxybenzene,
1,3-dibromo-2-(m-bromophenylmercapto)-4-phenoxybenzene,
1,2-dichloro-3-(p-chlorophenoxy)-6-(o-methoxy-p-chlorophenoxy)benzene,
1,3,5-trichloro-2-ar-chlorophenylmercapto-6-phenylmercaptobenzene, and
ar,ar′-dichloro-4,4′-bis(p-methylphenylmercapto)diphenyl sulfide.

The process of the invention is illustrated by the following non-limiting examples.

EXAMPLE 1

To a suitable reaction vessel containing conventional accessories such as an agitator, heating means and means for the measurement of pot and vapor temperatures, and fitted with a Dean-Stark trap there was charged 120 ml. of N-methyl-2-pyrrolidone followed by the addition of 32 grams of hydrated sodium sulfide (61% dry sodium sulfide). The resulting mixture was heated in a nitrogen atmosphere and refluxed at about 180° C. The temperature was slowly raised to 205° C., during which time water and any volatile impurities were removed. The reaction mass was then cooled somewhat and 88.2 grams of m-dichlorobenzene was then charged to the reaction vessel. The resulting mixture was then heated to reflux (184° C.), after which the pot temperature was slowly raised to about 197° C. over a period of about 12 hours. The solvent and unreacted m-dichlorobenzenes were then stripped from the reaction product at a temperature of 250° C. The reaction mass was then cooled and washed with sodium hydroxide solution and water. The product was then extracted by the use of benzene, filtered and distilled to provide bis(m-chlorophenyl) sulfide, having a boiling point range of 127° C. to 129° C. at 0.6 mm. of Hg.

EXAMPLE 2

The procedure of Example 1 was repeated but substituting 11.4 grams of lithium sulfide for sodium sulfide. Similar results were obtained.

EXAMPLE 3

Utilizing the procedure of Example 1, ar-phenoxy-ar′-chlorophenoxydiphenyl ether was reacted with sodium sulfide in N-methyl-2-pyrrolidone. The reaction was conducted over a period of about 15 hours at pot temperatures ranging from about 190° C. to 210° C. Thereafter the product was purified as in Example 1 to provide bis-(phenoxyphenoxyphenoxyphenyl) sulfide.

EXAMPLE 4

To a suitable reaction vessel there was charged 800 ml. of N-methyl-2-pyrrolidone, 181.6 grams of 1,3,5-trichlorobenzene and 63.9 grams of hydrated sodium sulfide (39.0 parts dry sodium sulfide). The resulting reaction mixture was heated to about 202° C. while removing water, folowed by refluxing for 13 hours at temperatures in the range of 195° C.–205° C. Thereafter the solvent was stripped and the reaction mass cooled to about 50° C. The reaction mass was then extracted with benzene and the extracted materials washed with water followed by fractional distillation to yield the desired product bis(3,5-dichlorophenyl)sulfide having a boiling range of 214° C. to 230° C. at 10 mm. of Hg.

EXAMPLE 5

To a suitable reaction vessel there was charged 92 ml. of N-methyl-2-pyrrolidone, 55.2 grams of m-chlorophenyl phenyl sulfide and 16.0 grams of hydrated sodium sulfide (61% dry sodium sulfide). The reaction mass was then heated in a nitrogen atmosphere for about 12 hours at pot temperatures ranging from about 170° C. to about 215° C. Thereafter the solvent was stripped and the residue was cooled and treated with aqueous sodium hydroxide. The lower aqueous layer was separated and extracted with benzene and the extracted material washed with water. The benzene layer was then separated, the benzene stripped and the residue fractionated to provide the desired product which is bis(m-phenylmercaptophenyl)sulfide having a boiling range of 252° C. to 256° C. at 0.5 mm. of Hg and a melting point of 55° C. to 56° C.

EXAMPLE 6

In the manner of Example 5, o-bromophenyl phenyl sulfide was reacted with sodium sulfide in N-methyl-2-pyrrolidone to provide bis(o-phenylmercaptophenyl) sulfide.

EXAMPLE 7

To a suitable reaction vessel there was charged 744 ml. of N-methyl-2-pyrrolidone, 409.34 grams of m-phenoxyphenyl chloride and 160 grams of hydrated sodium sulfide (assay 61% sodium sulfide). The reaction mass was then heated in a nitrogen atmosphere for about 15 hours at pot temperatures ranging from about 172° C. to about 213° C. During this heating period approximately 65 ml. of distillate was collected in the Dean-Stark trap. The solvent was then stripped, water was added to the residue and the resulting mixture heated (90° C.) and filtered. The filtrate was then extracted twice with toluene, the toluene extracts combined, and the combined extracts washed at 55° C. with 2% potassium hydroxide. The washed organic layer was then washed three times with water after which toluene was stripped. The residue was fractionated to provide bis(m-phenoxyphenyl) sulfide, a light yellow liquid, B.P. 227° C. at 0.1 mm. of Hg, M.P. 27° C.–29° C.

EXAMPLE 8

In the manner of Example 7, m-phenoxyphenyl chloride was reacted with sodium hydrosulfide (67% assay sodium hydrosulfide) to provide bis(m-phenoxyphenyl) sulfide.

EXAMPLE 9

In the manner of Example 7, m-chlorophenyl phenyl ether was reacted with sodium sulfide in pyrrolidone to provide bis(m-phenoxyphenyl) sulfide.

EXAMPLE 10

Generally following the procedure of Example 7, 415.5 parts of m-(m-phenoxyphenoxy)phenyl chloride and 11.9 parts of hydrated sodium sulfide (61% assay) were reacted in N-methyl-2-pyrrolidone to provide bis[m-(m-phenoxyphenoxy)phenyl] sulfide, B.P. 325° C. at 0.1 mm. of Hg.

EXAMPLE 11

Into a suitable reaction vessel there was added 150 grams of sodium sulfide (62.9% assay), 950 ml. of N-methyl-2-pyrrolidone and 658 grams of m-(m-phenylmercaptophenylmercapto)-phenyl chloride. The reaction mixture was refluxed for 20 hours at a pot temperature of about 212° C. The reaction mixture was then quenched with 800 ml. of 2% sodium hydroxide and 150 ml. of benzene thus separating the reaction mixture into aqueous and organic layers. The layers were separated and the aqueous layer was washed twice with benzene. The benzene washes were combined with the main organic portion. A crystalline precipitate formed in the organic portion which was filtered off and dried. Recrystallization from benzene yielded bis[m-(m-phenylmercaptophenylmercapto)phenyl] sulfide in 97.6% purity.

EXAMPLE 12

In the manner of Example 7, 248.1 grams of m-phenoxyphenyl chloride, 188.1 grams of m-chlorophenyl phenyl sulfide and 153.6 grams of hydrated sodium sulfide (61% assay) were reacted in 650 ml. of N-methyl-2-pyrrolidone to provide a mixture of (a) bis(m-phenoxyphenyl) sulfide, (b) m-phenylmercaptophenyl m-phenoxyphenyl sulfide and (c) bis(m-phenylmercaptophenyl)sulfide in a weight ratio of (a):(b):(c) of 36:48:16, respectively.

EXAMPLE 13

To a suitable reaction vessel there was charged 120 ml. of N-methyl-2-pyrrolidone, 88.2 grams of m-dichlorobenzene and 27.6 grams of anhydrous potassium sulfide. The resulting mixture was refluxed for 12 hours under a nitrogen atmosphere at temperatures between 175° C. to 179° C. Thereafter the solvent was stripped and the pot residue was then treated with 100 grams of 10% sodium hydroxide. The treated residue was then extracted with benzene thereafter and the desired product, bis(m-chlorophenyl) sulfide, was recovered from the extract by distilling off the benzene.

EXAMPLE 14

To a suitable reaction vessel there was charged 170 grams of N - methyl-2-pyrrolidone and 29.9 grams of sodium sulfide (62.9% assay). The resulting mixture was heated to about 205° C. while removing water, after which 47.4 grams of 2-chlorothiophene was added and the resulting mixture refluxed for 48 hours at about 160° C. The reaction mixture was cooled and treated with 300 ml. of water resulting in the formation of an aqueous and an organic layer. The organic layer was separated, washed with water and dried leaving the desired product, thienyl sulfide, a liquid boiling at 87° C. to 92° C. (0.5 mm. of Hg).

EXAMPLE 15

To a suitable reaction vessel there was charged 170 ml. of N-methyl-2-pyrrolidone and 30.1 grams of sodium sulfide (62.4% assay). The reaction mass was heated in a nitrogen atmosphere, to a pot temperature of 203° C. removing water, after which was added 45.5 grams of 2-chloropyridine. The reaction mixture was refluxed for 4½ hours at 165° C., after which it was cooled. The mixture was vacuum distilled at about 110° C. and 1 mm. of Hg leaving a residue which was washed twice with water and vacuum distilled yielding the desired product, pyridyl sulfide boiling at 148° C., 1 mm. of Hg.

EXAMPLE 16

To a suitable reaction vessel there was added 204 grams of 2,4,4'-trichlorodiphenyl sulfide, 54.1 grams of sodium sulfide (62.4% assay) and 270 grams of N-methyl-2-pyrrolidone. The reaction mixture was heated to about 200° C. and refluxed for 14 hours. The reaction mixture was stripped of solvent and then diluted with toluene and dilute sodium hydroxide solution. The toluene layer was washed with water. The toluene was removed by distillation leaving a mixture of (a) 2,2'-bis(p-chlorophenylmercapto) - 5,5' - dichlorodiphenyl sulfide, (b) 2,4'-bis-(p - chlorophenylmercapto) - 5,3'-dichlorodiphenyl sulfide, (c) 2 - (p - chlorophenylmercapto) - 5-chloro-4'-(o,p - dichlorophenylmercapto)-diphenyl sulfide, (d) 3, 3'-dichloro - 4,4' - bis(p-chlorophenylmercapto)diphenyl sulfide, (e) 3-chloro - 4 - (p-chlorophenylmercapto)-4'-(o,p - dichlorophenylmercapto)diphenyl sulfide and (f) 4,4 - bis(o,p - dichlorophenylmercapto)diphenyl sulfide.

EXAMPLE 17

To a suitable reaction vessel there was charged 32 grams of sodium sulfide (61.0% assay) and 125 grams of N-methyl-2-pyrrolidone. The mixture was heated to a temperature of 210° C., removing water, after which 112.5 grams of m - trifluoromethyl bromobenzene was added. The reaction mixture was refluxed for 21½ hours at pot temperatures ranging from 175° C. to 202° C., 19 hours of which was at temperatures of 222° C. The reaction mixture was then washed with 150 grams of water and 150 grams of benzene. The benzene layer was separated from the water layer, dried and distilled at 100° C. under full aspirator vacuum to remove the benzene. The product was purified by distillation at 0.1 mm. pressure and temperatures ranging from 91° C. to 93° C. Analysis of the purified product indicated it to be bis(m-trifluoromethylphenyl) sulfide in 99.3% purity.

EXAMPLE 18

To a suitable reactor there was added 100 ml. of N-methyl-2-pyrrolidone and 12.4 grams (62.9% assay) sodium sulfide. The mixture was heated to remove water after which 28 grams of m-difluorobenzene was added. The reaction mixture was refluxed for 7 hours at pot temperatures ranging between 140° C. to 172° C., after which the pyrrolidone was removed from the reaction mixture by distillation. The residue was quenched with 100 grams of 1% sodium hydroxide and 50 ml. of benzene thus forming three layers, a bottom white solild, an intermediate aqueous layer and a top benzene layer. The lower two layers were separated from the benzene layer and again washed with benzene. The benzene washes were combined with the main benzene layer and extracted with 100 grams of water. The benzene was then removed by distillation leaving a product which was fractionally distilled yielding mainly bis(m-fluorophenyl) sulfide having a boiling range of 88° C. to 89° C. at 0.7 mm. of Hg and m-bis(m-fluorophenylmercapto)benzene having a boiling range of 179° C. to 186° C. at 0.8 mm. of Hg.

EXAMPLE 19

The procedure of Example 17 was repeated but 100 ml. of methylacetamide was substituted for the N-methyl-2-pyrrolidone. Similar results were obtained.

EXAMPLE 20

To a suitable reaction vessel there was charged 28.61 grams of sodium sulfide (61% assay), 205 ml. of N,N-dimethylacetamide and 52.8 grams of m-chlorophenyl phenyl sulfide. The reaction mixture was heated at temperatures between 195° C. and 200° C. for a period of about 15 hours. After completion of the reaction the N,N-dimethylacetamide was removed by distillation. The residue was quenched with water forming organic and aqueous layers and then filtered. The organic and aqueous layers of the filtrate were separated and the aqueous layer was extracted with 350 grams of benzene. The benzene extract was combined with the main organic layer and the combinations extracted with two 100 gram portions of 3% sodium hydroxide followed by three 100 ml. portions of water. The benzene was then distilled off to a temperature of 210° C., yielding a residue which can be fractionated to yield bis(m-pheylmercaptophenyl) sulfide.

EXAMPLE 21

To a suitable reactor there was added 200 ml. of N-methylacetamide and 37.5 grams (62.9% assay) sodium sulfide. The mixture was heated to remove water after which 48 grams of fluorobenzene was added. The reaction mixture was refluxed for 12 hours at pot temperatures ranging from 175° C. to 200° C., after which the acetamide was removed from the reaction mixture by distillation. The product was purified according to the procedure of Example 19 yielding diphenyl sulfide.

EXAMPLE 22

In the manner of Example 20, m-fluorophenyl phenyl ether was extracted with potassium sulfide in N-methylbutyramide to provide bis(m-phenoxyphenyl) sulfide.

EXAMPLE 23

To a suitable reactor there was added 12.4 grams of sodium sulfide (62.9% assay) and 200 ml. of N-methyl-2-pyrrolidone. The mixture was heated to reflux, driving off water after which 26.1 grams of m-chlorofluorobenzene was added and reflux continued at about 196° C. for 6 hours. The pyrrolidone solvent was removed by distillation and the residue treated with 200 grams of 1% sodium hydroxide and 50 ml. of benzene. The mixture formed aqueous and organic layers which were separated. The aqueous layer was washed with benzene after which the washings were combined with the main organic layer. The benzene was removed by distillation under reduced pressure. Fractionation of the crude product yielded mainly bis(m-chlorophenyl) sulfide.

EXAMPLE 24

To a suitable reaction vessel there was charged 12.5 grams of sodium sulfide trihydrate and 80 grams of N-methyl-2-pyrrolidone under nitrogen. Water was stripped from the system by raising the pot temperature to 205° C. After slight cooling, 56.1 grams of 3,5-dichlorodiphenyl sulfide was added to the pot. The reaction mixture was refluxed for 16 hours, then quenched at room temperature with 100 ml. of 1% lye. After filtration at 70° C., the organic layer was separated, combined with a benzene extract of the aqueous layer, and washed once with water. The benzene was removed from the organic layer by atmospheric distillation, thereafter vacuum distillation of the crude residue produced the desired 3,3'-dichloro-5,5'-bis(phenylmercapto)diphenyl sulfide.

EXAMPLE 25

In the manner of Example 23, 3,5-dichlorodiphenyl ether was condensed with sodium sulfide in N-methyl-2-pyrrolidone to produce 3,3'-dichloro-5,5'-diphenoxydiphenyl sulfide.

EXAMPLE 26

In the manner of Example 19, an equimolar mixture of 3,5-dichlorodiphenyl ether and 3,5-dichlorodiphenyl sulfide was condensed with sodium sulfide in N-methyl-2-pyrrolidone. The reaction was run for 20 hours at a pot temperature in the range of 205° C. to 215° C. The product was a mixture of 3,3'-dichloro-5,5'-diphenoxydiphenyl sulfide, 3,3'-dichloro-5-phenoxy-5'-phenylmercaptodiphenyl sulfide, and 3,3'-dichloro-5,5'-bis(phenylmercapto)diphenyl sulfide.

EXAMPLE 27

In the manner of Example 20, m-phenoxyphenyl trichlorophenyl ether was condensed with sodium sulfide in N-methyl-2-pyrrolidone. An isomeric mixture of ar,ar'-bis(m-phenoxyphenoxy)-ar,ar'-dichlorodiphenyl sulfides was obtained.

EXAMPLE 28

To a suitable reaction vessel there was charged under nitrogen 12.5 grams of sodium sulfide (62.4% assay) and 55 ml. of N-methyl-2-pyrrolidone. After removing water from the mixture, 30.6 grams of 2,5-dichlorothiophene was added to the reaction vessel and the mixture was refluxed for about 10 hours at a temperature of about 178° C. The reaction mixture was then quenched with 100 ml. of 1% sodium hydroxide and 100 ml. of benzene and transferred to a separatory funnel. The organic and aqueous layers were separated. The benzene layer was filtered and the filtrate was washed successively with 1% sodium hydroxide and water. The benzene was removed by distillation leaving a residue, which upon fractionation yielded 5,5'-dichloro-2,2'-dithienyl sulfide.

EXAMPLE 29

In the manner of Example 28, 2,6-dichloropyridine was condensed with sodium sulfide in N-methyl-2-pyrrolidone to produce 6,6'-dichloro-2,2'-dipyridyl sulfide.

The preferred amide solvents are tertiary amides typical examples of which are dimethylformamide, dimethylacetamide, diethylacetamide, dimethylpropionamide, dimethylbutyramide, diisopropylacetamide, dimethylcaproamide, dimethyllauramide, dimethylpalmitamide, dimethylstearamide, dicyclohexylformamide, dicyclohexylacetamide, methylethylformamide, methyloctadecylacetamide and the like, and N-methyl-2-pyrrolidone, N-ethyl-2-pyrrolidone, N-propyl-2-pyrrolidone, N-octyl-2-pyrrolidone, N-octadecyl-2-pyrrolidone and the like.

Other amide solvents which can also be used in the method of this invention are secondary amides such as methylacetamide, ethylformamide, cyclohexylacetamide, cyclohexylformamide, methylstearamide, methylpalmitamide, methyllauramide, methylcaproamide, isopropylacetamide, N-methylbutyramide, methylpropionamide and the like.

Also, amides of phosphorus and sulfur acids can be used. Typical phosphorus acids are phosphonic and phosphinic acids, phosphoric acid, phosphorous acid and phosphonous acids. Typical sulfur acids are the sulfonic and sulfinic acids, sulfuric acid and sulfurous acid. More specifically, exemplary amides of phosphorus acids are hexamethylphosphoric triamide, P,P-dimethyl-N,N-dimethylphosphinic amide, pentamethylphosphonic diamide, P-ethyl-N,N,N',N'-tetramethylphosphonic diamide, N,N-dimethyl-P-phenylphosphonous amide, P-butyl-N,N,N',N'-tetramethylphosphonic amide, hexaethylphosphoric triamide, tetramethylphosphorous diamide, P-methyl-N,N,N',N'-tetraethylphosphonic amide, P,P-diethyl-N,N-dimethylphosphinic amide and N,N-dimethyl-P-ethylphosphonous amide. Exemplary amides of sulfur acids are tetramethylsulfamide, tetramethylsulfurous amide, N,N-diethylbenzenesulfonamide, N,N - dibutylbenzenesulfinic amide, tetraethylsulfamide, tetraethylsulfurous amide, N, N-dimethylbenzenesulfonamide and N,N-dimethylbenzenesulfinic amide.

With regard to the halogen-substituted compound, $R(X)_n$, further examples of substituted aromatic radicals which R can be are xylyl, xylylene, mesityl, ethylphenyl, n-propylphenylene, isopropylphenyl, n-propylphenyl, n-butylphenyl, tert.-butylphenylene, amylphenyl, diisopropylphenyl, caprylphenylene, octylphenyl, nonylphenyl, decylphenyl, laurylphenyl, laurylphenylene, tridecylphenyl, hexadecylphenyl, stearylphenyl, wax phenyl, methylphenylene, hydroxyphenylene, hydroxyphenyl, methylhydroxyphenyl, methylhydroxyphenylene, butoxyphenyl, lauroxyphenyl, lauroxyphenylene, methylmethoxyphenyl, ethylmethoxyphenyl, ethylchlorophenyl, isopropylchlorophenylene, phenanthryl, anthryl, methylisopropylphenanthryl, chloronaphthyl, benzohydryl, biphenylyl, biphenylene, perfluoroethylphenyl, perfluoromethylphenyl, perfluorobutylphenyl, halophenyl and the like. Additionally, halides such as the mono- and dihalonaphthalenes, ar-, mono- and ar-dihalobenzophenones, halothiophenes, halophenothiazines, mono-, di- and trihalophenyls, halopyrazines, halopyrroles, halopyrimidines, haloquinolines, haloisoquinolines, halobenzothiazoles, halobenzoimidazoles, halobenzenesulfonates and the like, can be used.

Examples of other substituted aromatic compounds useful in the method of this invention are aromatic halides, 1-chloro-2-fluorobenzene, 1-chloro-3-fluorobenzene, 1-chloro-4-fluorobenzene, 1,2-dichlorobenzene, 1-bromo-3-fluorobenzene, 1-bromo-2-chlorobenzene, 1-bromo-3-chlorobenzene, 1,3-dibromobenzene, 1-iodo-3-chlorobenzene, 1-iodo-4-bromobenzene, 1-iodo-3-fluorobenzene, 1,4-diiodobenzene, 1-chloro-2,3-difluorobenzene, 1-chloro-2,4-difluorobenzene, 1,2,4-trichlorobenzene, 1,3,5-trichlorobenzene, 1-bromo-3,4-dichlorobenzene, 1-bromo-3,4-difluorobenzene, 1-iodo-2,5-difluorobenzene, 1-iodo-3,5-dichlorobenzene, 1-iodo-2,3-dibromobenzene, and the like;

Sulfides such as 1-chloro-2-phenylmercaptobenzene,
1-chloro-3-phenylmercaptobenzene,
1-chloro-4-phenylmercaptobenzene,
1-bromo-3-phenylmercaptobenzene,
1-bromo-4-phenylmercaptobenzene,
1-iodo-2-phenylmercaptobenzene,
1-iodo-3-phenylmercaptobenzene,
1-chloro-2-phenylmercapto-4-fluorobenzene,
1-bromo-3-phenylmercapto-2-chlorobenzene,
1-iodo-2-phenylmercapto-3-chlorobenzene,
1,2-dichloro-3-phenylmercaptobenzene,
1,2-dibromo-4-phenylmercaptobenzene,
1,3,5-trichloro-2-(3,5-dichlorophenylmercapto)-4-fluorobenzene,
2,4-dibromo-3-(2,4-dibromophenylmercapto)-5-chlorobenzene,
1-fluoro-2-phenylmercapto-3-fluorobenzene,
3-phenyl-mercapto-3'-(m-chlorophenylmercapto)diphenyl sulfide,
1-bromo-2-(3-bromophenylmercapto)-4-bromobenzene,
1-iodo-2-(3-iodophenylmercapto)-4-iodobenzene,
1-phenylmercapto-3-(m-chlorophenylmercapto)benzene;

Ethers such as 4-chlorodiphenyl ether,
2-chlorodiphenyl ether,
3-bromodiphenyl ether,
4-iododiphenyl ether,
4-fluorodiphenyl ether,
4-(p-chlorophenoxy)diphenyl ether,
2-(o-bromophenoxy)diphenyl ether,
4-(m-chlorophenoxy)diphenyl ether,
3-phenoxy-3'-(m-chlorophenoxy)diphenyl ether,
3-(p-iodo-phenoxy)diphenyl ether,
4-(o-chlorophenoxy)diphenyl ether,
1-chloro-2-phenoxyphenyl-4-fluorobenzene,
1-bromo-3-phenoxyphenyl-2-chlorobenzene,
1-iodo-2-phenoxyphenyl-3-chlorobenzene,
1,2-dichloro-3-phenoxyphenylbenzene,
1,2-dibromo-4-phenoxyphenylbenzene,
1,3,5-trichloro-2-(3,5-dichlorophenoxyphenyl)-4-fluorobenzene,
2,4-dibromo-3-(2,4-dibromophenoxyphenyl)-5-chlorobenzene,
1-fluoro-2-phenoxyphenyl-3-fluorobenzene,
1-bromo-2-(3-bromophenoxyphenyl)-4-bromobenzene,
and
1-iodo-2-(3-iodophenoxyphenyl)-4-iodobenzene.

The method of this invention can be used to produce linear, benzene, insoluble polyphenyl thioether polymers by employing either ortho- or para-substituted dihalophenyl starting materials. Such polymers contain halogens on the terminal rings in the ortho or para position with respect to the sulfur atom bridging each terminal phenyl ring with the interior phenyl rings. Mixed halogens can be employed as for example p-fluorochlorobenzene and p-chlorobromobenzene or the corresponding ortho isomers. Also, ortho and para isomers of dihalodiphenyl sulfides can be employed to produce polymers as for example 2,2'-dichlorodiphenyl sulfide, 4,4'-dichlorodiphenyl sulfide, 2,4'-difluorodiphenyl sulfide, 2,4'-dibromodiphenyl sulfide and 2,2'-diiododiphenyl sulfide. Polymer formation is diminished by employing a large excess of ortho or para dihaloaryl starting material with respect to the alkali metal sulfide, e.g., a molar ratio of ortho or para dihaloaryl to alkali metal sulfide in excess of about four to one, respectively. When a large excess of dihaloaryl starting material is employed, low molecular weight products are obtained as when meta dihalo isomers are employed.

Other polyhalothiophenes useful in the method of this invention to prepare halodithienyl sulfides are 2,4-dichlorothiophene, 3,4-dibromothiophene, 2,3,4,5-tetrachlorothiophene, 3,4,5-trichlorothiophene, 2,5-dibromothiophene, 2,3,4,5-tetrabromothiophene, 2,5-diiodothiophene, 3,4-diiodothiophene, 2,3,4,5-tetraiodothiophene, 2,5-difluorothiophene, 3,4-difluorothiophene and 2,3,4,5-tetrafluorothiophene.

In the production of dipyridyl sulfide according to the method of this invention, monohalopyridines can be employed such as bromopyridine, iodopyridine and fluoropyridine. Halodipyridyl sulfides can be prepared according to the method of this invention by employing polyhalopyridine, for example, 2,4-dichloropyridine, 2,3,5-trichloropyridine, 2,3,4,5-tetrachloropyridine, 2,4-dibromopyridine, 2,3,5-tribromopyridine, 2,3,4,5-tetrabromopyridine, 2,4-diiodopyridine, 2,3,5-triiodopyridine, 2,4-difluoropyridine, 2,3,5-trifluoropyridine and 2,3,4,5-tetrafluoropyridine.

The compounds of this invention are useful as functional fluids, even at high temperatures of the order of 700° F., which are used as force transmission fluids for the transmission of pressure, power or torque in fluid pressure or torque actuated mechanisms, such as for example, the "hydraulic fluids" for transmitting fluid pressure to the ram cylinders of hydraulic presses or in devices for the absorption and dissipation of energy such as shock absorbers or recoil mechanisms, or for transmission of torque through torque converter types of fluid couplings. The functional fluids of this invention may also be used as damping fluids which are the liquid compositions used for damping mechanical vibrations or resisting other rapid mechanical movements. The functional fluids of this invention are also suitable for use as synthetic lubricants between relatively moving mechanical parts, as bases for synthetic greases, as the liquid material in the filters of air conditioning systems, as potting compounds and as dielectric media in electronic equipment such as capacitors. When used as functional fluids the compounds of this invention can be used per se or they can be used in combination with various addition agents, such as oxidation inhibitors, rust inhibitors, antifoaming agents, detergents, viscosity index improvers compatible therewith, etc., whenever specific uses require such addition agents. In some cases the compounds of the invention are solids at room temperature and accordingly are suitable as functional fluids at temperatures above their melting point.

We claim:

1. A compound represented by the formula

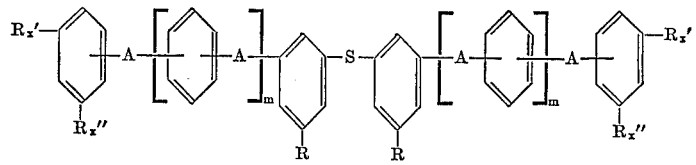

where R, R' and R" are each halogen, $x$ is an integer from 0 to 1 and A is selected from the group consisting of oxygen and sulfur and $m$ is an integer from 0 to 2 provided both terminal phenyl groups are attached to A at like positions equal distant on the ring from both $R'_x$ and $R''_x$ 2. A compound represented by the structure

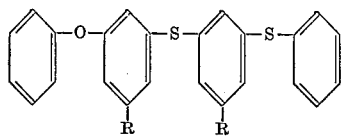

where R is a halogen.

3. A compound represented by the formula

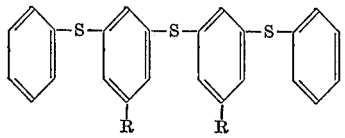

where R is halogen.

4. A compound represented by the formula

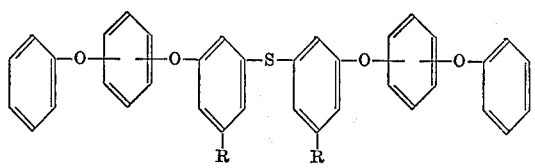

where R is halogen.

5. A compound represented by the formula

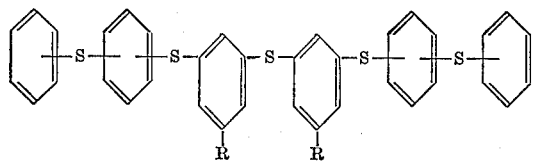

where R is halogen.

6. A compound represented by the formula

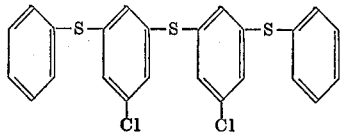

7. A mixture of 2,2'-bis(p-chlorophenylmercapto)-5,5'-dichlorodiphenyl sulfide, 2,4'-bis(p - chlorophenylmercapto)-5,3'-dichlorodiphenyl sulfide, 2 - (p-chlorophenylmercapto)-5-chloro - 4' - (o,p - dichlorophenylmercapto) diphenyl sulfide, 3,3' - dichloro-4,4'-bis(p - chlorophenylmercapto)diphenyl sulfide, 3 - chloro-4-(p-chlorophenylmercapto)-4'-(o,p-dichlorophenylmercapto)diphenyl sulfide and 4,4' - bis(o,p - dichlorophenylmercapto)diphenyl sulfide.

8. A mixture of 3,3'-dichloro-5,5'-diphenoxydiphenyl sulfide, 3,3'-dichloro-5-phenoxy-5'-phenylmercaptodiphenyl sulfide and 3,3'-dichloro-5,5'-diphenylmercaptodiphenyl sulfide.

9. A process for preparing thioethers comprising reacting:
 (a) a halogen-substituted compound selected from the class consisting of phenoxyphenyl halides, a phenoxyphenoxyphenyl halide, a phenylmercaptophenylmercaptophenyl halide or a phenylmercaptophenyl halide; with
 (b) potassium, sodium or lithium sulfide;
 (c) in an amide solvent selected from the group consisting of alkyl carboxamides represented by the structure

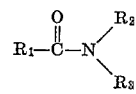

pyrrolidones represented by the structure

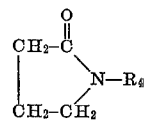

where $R_1$ is selected from the group consisting of

aryl, hydrogen and alkyl radicals of from 1 to 18 carbon atoms, $R_2$ and $R_3$ are selected from the group consisting of hydrogen and alkyl radicals of from 1 to 18 carbon atoms, providing at least one of $R_2$ and $R_3$ is an alkyl radical and $R_4$ is selected from the group consisting of hydrogen and alkyl radicals of from 1 to 18 carbon atoms and amides represented by the structure

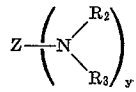

where Z is an acid radical residue selected from the group consisting of phosphorus and sulfur acids, $y$ is an integer from 1 to 3 and $R_2$ and $R_3$ have the same meaning as above.

10. The process of claim 9 where X is fluorine.

11. A process for preparing a bis(phenoxyphenyl) sulfide which comprises reacting:
 (a) sodium sulfide and
 (b) a phenoxyphenyl halide
 (c) in an amide solvent selected from the group consisting of alkyl carboxamides represented by the structure

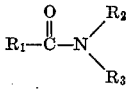

where $R_1$ is selected from the group consisting of

aryl, hydrogen and alkyl radicals of from 1 to 18 carbon atoms, and $R_2$ and $R_3$ are selected from the group consisting of hydrogen and alkyl radicals of from 1 to 18 carbon atoms providing at least one of $R_2$ and $R_3$ is an alkyl radical, pyrrolidones represented by the structure

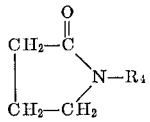

where $R_4$ is selected from the group consisting of hydrogen and alkyl radicals of from 1 to 18 carbon atoms and amides represented by the structure

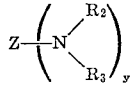

where Z is an acid radical residue selected from the group consisting of phosphorus and sulfur acids, y is an integer from 1 to 3 and $R_2$ and $R_3$ have the same meaning as above.

12. The process of claim 11 where (b) is a phenoxyphenyl fluoride.

13. A process for preparing a bis(phenylmercaptophenylmercaptophenyl) sulfide which comprises reacting:
 (a) sodium sulfide and
 (b) a phenylmercaptophenylmercaptophenyl halide
 (c) in an amide solvent selected from the group consisting of pyrrolidones represented by the structure

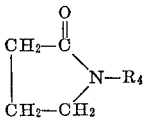

where $R_4$ is selected from the group consisting of hydrogen and alkyl radicals of from 1 to 18 carbon atoms, alkyl carboxamides represented by the structure

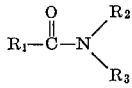

where $R_1$ is selected from the group consisting of

aryl, hydrogen and alkyl radicals of from 1 to 18 carbon atoms, and $R_2$ and $R_3$ are selected from the group consisting of hydrogen and alkyl radicals of from 1 to 18 carbon atoms providing at least one of $R_2$ and $R_3$ is an alkyl radical
 and amides represented by the structure

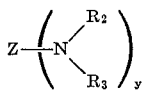

where Z is an acid radical residue selected from the group consisting of phosphorus and sulfur acids, y is an integer from 1 to 3 and $R_2$ and $R_3$ have the same meaning as above.

14. The process of claim 13 where (b) is 1-phenylmercapto-3-(m-fluorophenylmercapto)benzene.

15. A process for preparing bis(m-phenylmercaptophenyl) sulfide which comprises reacting:
 (a) sodium sulfide and
 (b) m-chlorophenyl phenyl sulfide
 (c) in a carboxamide solvent selected from the group consisting of alkyl carboxamides represented by the structure

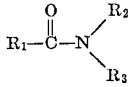

pyrrolidones represented by the structure

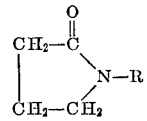

where $R_1$ is selected from the group consisting of

aryl, hydrogen and alkyl radicals of from 1 to 18 carbon atoms, and $R_2$, $R_3$ and $R_4$ are selected from the group consisting of hydrogen and alkyl radicals of from 1 to 18 carbon atoms providing at least one of $R_2$ and $R_3$ is an alkyl radical
 and amides represented by the structure

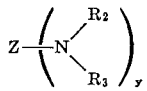

where Z is an acid radical residue selected from the group consisting of phosphorus and sulfur acids, y is an integer from 1 to 3 and $R_2$ and $R_3$ have the same meaning as above.

16. A process of claim 15 wherein the carboxamide solvent is N-methyl-2-pyrrolidone.

17. A process for preparing bis(m-phenoxyphenyl)sulfide which comprises reacting in N-methyl-2-pyrrolidone
 (a) sodium sulfide and
 (b) m-phenoxphenyl chloride.

18. A process for preparing 3,3'-bis(m-phenoxyphenoxy)diphenyl sulfide which comprises reacting in N-methyl-2-pyrrolidone
 (a) sodium sulfide and
 (b) m-(m-phenoxyphenoxy)phenyl chloride.

19. A process for preparing a bis(phenoxyphenoxy)phenyl sulfide which comprises reacting:
 (a) sodium sulfide and
 (b) a phenoxyphenoxy phenyl halide
 (c) in an amide solvent selected from the group consisting of pyrrolidones represented by the structure

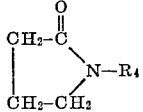

where $R_4$ is selected from the group consisting of hydrogen and alkyl radicals of from 1 to 18 carbon atoms, alkyl carboxamides represented by the structure

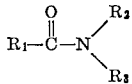

where $R_1$ is selected from the group consisting of

aryl, hydrogen and alkyl radicals of from 1 to 18 carbon atoms, and $R_2$ and $R_3$ are selected from the group consisting of hydrogen and alkyl radicals of from 1 to 18 carbon atoms providing at least one of $R_2$ and $R_3$ is an alkyl radical and amides represented by the structure

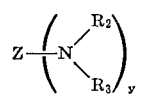

where Z is an acid radical residue selected from the group consisting of phosphorus and sulfur acids, y is an integer from 1 to 3 and $R_2$ and $R_3$ have the same meaning as above.

20. A process for preparing a mixture of thioethers which comprises reacting in N-methyl-2-pyrrolidone
(a) sodium sulfide and
(b) a mixture of m-chlorophenyl phenyl ether and m-chlorophenyl phenyl sulfide.

References Cited

UNITED STATES PATENTS

| | | | |
|---|---|---|---|
| 3,098,103 | 7/1963 | Reifschucider | 260—609 |
| 3,119,877 | 1/1964 | Campbell et al. | |
| 3,311,665 | 3/1967 | Campbell et al. | |
| 3,321,403 | 5/1967 | Campbell et al. | 260—48.2 |
| 3,321,529 | 5/1967 | Campbell. | |
| 3,322,834 | 5/1967 | Hill et al. | 260—609 |
| 3,374,274 | 3/1968 | Spainhour | 260—609 |
| 3,397,244 | 8/1968 | Louthan | 260—609 |
| 3,415,889 | 12/1968 | Louthan | 260—609 |

OTHER REFERENCES

Reid: Organic Chemistry of Bivalent Sulfur, vol. 2, Chemical Publshing Co., N.Y. 1960, p.–18.

CHARLES B. PARKER, Primary Examiner

D. R. PHILLIPS, Assistant Examiner

U.S. Cl. X.R.

252—47, 425, 48.2, 48.4, 48.8, 63.7, 77, 78; 260—243, 250, 256.2, 288, 294.8, 306, 309.2, 326.9, 327, 332.5, 505, 591